United States Patent Office 2,854,206
Patented Sept. 30, 1958

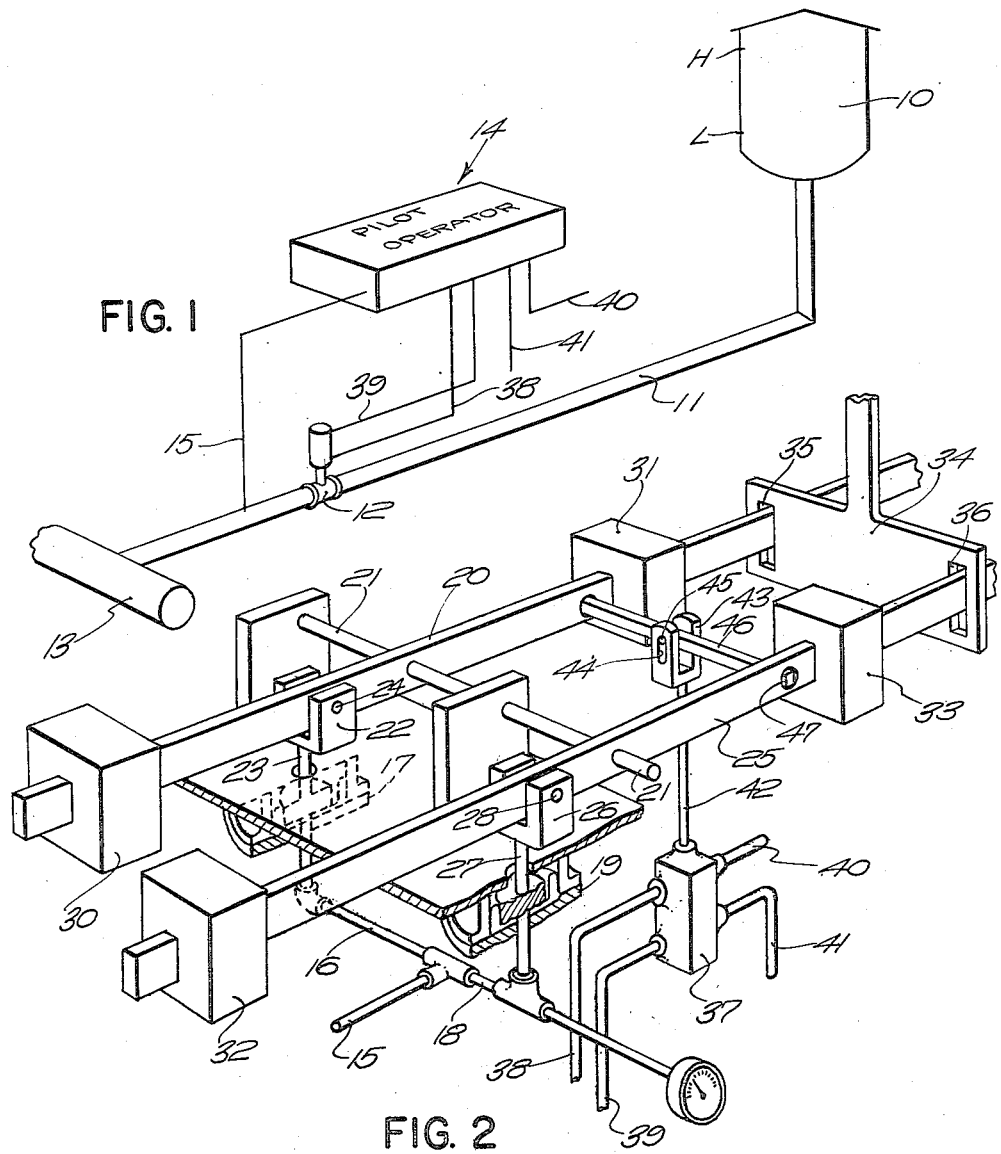

2,854,206

DIFFERENTIAL PRESSURE MECHANISM

Kalman Kormos, North Scituate, R. I., assignor to B-I-F Industries, Inc., a corporation of Rhode Island Application September 19, 1956, Serial No. 610,799

5 Claims. (Cl. 251—58)

This invention relates to a differential pressure mechanism of the type which may be utilized for operating a pilot valve or pilot switch for a control function.

One of the objects of this invention is to provide a device for the maintaining of a condition between different high and low limits in a system and utilize the pressure in the system for operating the device.

Another object of the invention is to provide a mechanism which may be adjusted for various pressures, thus making the same adaptable for a wide range of use.

Another object of the invention is to provide a mechanism which will be mechanical in its action as distinguished from electrical and will be positively operated in the movements which occur.

Another object of the invention is to provide an arrangement so that the control may be either forward or reverse in response to either a rising or a falling pressure.

With these and other objects in view, the invention consists of certain novel features of construction as will be more fully described and particularly pointed out in the appended claims.

In the accompanying drawings:

Figure 1 is a diagrammatic view illustrating an arrangement in which the device of this invention may be utilized;

Figure 2 is a perspective view also largely diagrammatic and partly in section illustrating the mechanism by which the invention is carried out.

In proceeding with this invention, I provide two different parts, one of which will be operated at one pressure which may be the low pressure limit of the system and the other part of which will be operated at the high pressure limit of the system. A valve is provided for controlling the inlet to the system, and it will remain in one condition, either open or closed, when the system is between the limits at which each of the parts of the system operates; but upon the system arriving at either end of the high and low limits, the two parts will operate so as to cause the valve to move to either open or closed position and restore the system to the intermediate condition. The arrangement is such that if either one of the parts operates alone, the valve will not be operated. I thus may utilize two different pressures in the same system for operating a valve when the system arrives at either its high or low limits.

With reference to the drawings, I have shown one arrangement in which the invention may be utilized, although it will be apparent that other uses may be made of the mechanism herein disclosed.

In that illustration given, 10 designates a tank in a water supply system in which the level of water is desired to be kept between a high limit H and a low limit L. The supply to this tank is through a pipe 11 which is controlled by a valve 12 from a supply line 13. The control of this valve 12 is through the mechanism designated generally 14, which is connected to the pipe 11 through a conduit 15.

Referring now to Figure 2, the conduit 15 has a branch line 16 directing its pressure upon a piston or diaphragm 17 and a branch line 18 directing its pressure upon a diaphragm 19. A first lever 20 is pivoted on the axis 21 and is connected by a clevis 22 to the rod 23 which will be moved in response to movement of the diaphragm 17. This clevis has a pin 24 extending through a hole in the lever 20 and connecting it thereto.

A second lever 25 is pivoted on the same axis 21 and is connected to the diaphragm 19 through a clevis 26, pin 28 and rod 27.

A weight 30 is located on the lever 20 at one side of the pivot and a counterweight 31 is on the other side of the pivot. A weight 32 is secured to the lever 25 on one side of the pivot while a counterweight 33 is secured to this lever 25 on the other side of the pivot. The weights are so adjusted on each of the levers as to cause these levers to move about the pivot in a clockwise direction as seen in Figure 2 in response to different pressures. The weights 30, 31 on lever 20 are so adjusted that when the pressure at the low level point L of the tank 10 is exceeded, the lever 20 will move in a clockwise direction about its pivot 21, while the weights 32, 33 on the lever 25 are so adjusted that when the pressure in the tank 10 at the high level H is reached, the lever 25 will rotate clockwise about the pivot 21 by reason of the movement of the diaphragm 19. Limits to the movement of each of the levers is provided by any suitable means, that shown being illustrated as a plate 34 having a slot 35 through which the lever 20 extends and a slot 36 through which the lever 25 extends. The ends of these slots will provide limits beyond which the levers will not move.

A pilot valve shown at 37 is connected to valve 12 through conduits 38 and 39 so as to open or close valve 12 by fluid pressures admitted through pipe 40 from any suitable source. The stem 42 extends upwardly from the pilot valve 37. At the upper end of the stem there is a clevis 43 which has slots 44 in its arms receiving a pin 45 which extends through a whiffletree 46 laterally therefrom and substantially at the center thereof. This whiffletree 46 is connected to the levers 20 and 25 by means of a ball and socket or other connection which will allow swivel movement therein. This connection is roughly shown as the end of the whiffletree 46 extending into the hole 47 in the lever which closely receives the same although permits some rocking movement thereof. It will be appreciated that the arc of swing of these levers is very limited and but a slight movement occurs and therefore allowance for substantial play is not essential. The length of the slots 44 in the clevis is such that when one end only of the whiffletree 46 is moved by its lever, the pin 45 will be moved from one end of the slots to the other without actuating the valve stem 42; but when the other lever operates in the same direction, the pin, which is then at the end of its slot, will be moved for actuation of valve 37 through its valve stem 42.

In operation, assuming that both levers are in their extreme counter clockwise position, that valve 12 is open, and that there is sufficient pressure in the supply line 13 so that liquid is flowing into and filling tank 10, the level of liquid will gradually build up in the tank 10; and when the elevation of the low limit L is reached by the liquid, the lever 20 which is set to respond to pressure developed above the low limit will then swing clockwise moving the end of the whiffletree 46 which is in the lever 20 to a lowered position and the pin 45 will move to the low end of the slots 44. The stop 35 will have limited the movement of the lever 20 clockwise so that the valve stem 42 will not be actuated but merely the slack afforded by the slot and pin connection at 44 will be taken up. At this point it is necessary, of course, that the valve stem 42 shall have enough friction to remain in its raised position and not drop by its own weight. The tank will cotinue to fill; and when the high limit H is reached, the diaphragm 19 will be actuated causing the lever 25 to be moved clockwise about its pivot 21 and will lower the end of the whiffletree 46 in the lever 25 and upon such lowering of the whiffletree in the lever 25, the valve stem 42 will be moved downwardly actuating the pilot valve 37 which in turn will operate the valve 12 to close and prevent further liquid from entering the tank 10.

If now the pressure in the supply line 13 drops to a pressure below that corresponding to the level H, the lever 25 will be permitted to move by its weight arrangement counter clockwise and will move the pin 45 to the upper end of the slot 44. This will not cause movement of the valve stem 42 or the pilot valve 37 to change its position, therefore the main valve 12 will remain closed. Upon further drop of pressure in the supply line 13 below that corresponding to the level L, then the diaphragm 17 will no longer support the lever 20 in its clockwise position but will permit it to rotate counter clockwise thereby raising the other end of the whiffletree 46 and thus raise the valve stem 42 to actuate the valve 37 to open the valve 12 and permit liquid to flow from the tank to augment the supply line during periods of low pressure therein.

It should be noted that one source of pressure which may be connected to pipe 40 for operation of valve 12 is the pressure in the supply line 13, if reliable.

I claim:

1. In a system having different fluid pressures a differential pressure mechanism comprising a first means movable in response to pressure of one value in the system and a second means movable in response to pressure of a different value in the same system, a first pivoted lever movable by the first means and a second pivoted lever movable by the second means, means to limit the movement of both levers in both directions, a control valve mechanism in said system, means connecting said control valve mechanism and said two levers including a lost motion device having sufficient lost motion so that a movement of one lever to the limit of its movement in one direction will occur prior to the movement of the other lever in the same direction whereby movement of one of the levers takes up the lost motion without operating the control valve mechanism and movement of both levers serves to operate said control valve mechanism.

2. In a system as in claim 1 wherein said levers have a common axis and wherein the last said means are connected to each lever on the same side of the pivot of the levers.

3. In a system as in claim 1 wherein said levers have a common axis and wherein the last said means are connected to each lever on the same side of the pivot of the levers and both levers move in the same direction to operate said control valve mechanism.

4. In a system as in claim 1 wherein said connecting means comprises a whiffletree connecting said levers and the connection to said valve mechanism is through a clevis connected to said whiffletree.

5. In a system as in claim 1 wherein said connecting means comprises a whiffletree connecting said levers and with a pin midway of its length and a slotted clevis receives said pin in its slots and connects the whiffletree to said valve mechanism.

References Cited in the file of this patent

UNITED STATES PATENTS 2,713,351    Van Nest _____ July 19, 1955